United States Patent
Kaplan et al.

(10) Patent No.: US 6,247,522 B1
(45) Date of Patent: Jun. 19, 2001

(54) HEAT EXCHANGE MEMBERS FOR THERMAL STORAGE APPARATUS

(75) Inventors: Vladimir Kaplan, San Mateo, CA (US); Robert P. Miller, Riva, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/186,172

(22) Filed: Nov. 4, 1998

(51) Int. Cl.$^7$ .................................................. F28D 17/00
(52) U.S. Cl. ............................................. 165/10; 165/902
(58) Field of Search .............................. 165/10, 902, 166

(56) References Cited

U.S. PATENT DOCUMENTS

| | | | |
|---|---|---|---|
| 2,933,885 | * 4/1960 | Benedek et al. | 165/10 |
| 4,098,331 | 7/1978 | Ford et al. | 165/170 |
| 4,146,057 | * 3/1979 | Friedman et al. | 165/10 |
| 4,294,078 | 10/1981 | MacCracken | 62/59 |
| 4,366,856 | * 1/1983 | Yanadori et al. | 165/10 X |
| 4,371,028 | * 2/1983 | Helshoj | 165/10 |
| 4,831,831 | 5/1989 | Carter et al. | 62/59 |
| 4,964,279 | 10/1990 | Osborne | 62/59 |
| 5,090,207 | * 2/1992 | Gilbortron et al. | 165/10 |
| 5,109,920 | 5/1992 | Merryfull | 165/163 |
| 5,193,352 | 3/1993 | Smith et al. | 62/90 |
| 5,383,339 | 1/1995 | McCloskey et al. | 62/238.5 |
| 5,386,709 | 2/1995 | Aaron | 62/199 |
| 5,390,505 | 2/1995 | Smith et al. | 62/173 |
| 5,596,877 | 1/1997 | Morrison | 62/59 |
| 6,105,659 | * 8/2000 | Pocol et al. | 165/10 |

FOREIGN PATENT DOCUMENTS

| | | | |
|---|---|---|---|
| 2942147 | * 6/1981 | (DE) | 165/10 |
| 4030396 | * 6/1991 | (DE) | 165/10 |
| 2077900 | * 12/1981 | (GB) | 165/10 |
| 0140594 | * 8/1983 | (JP) | 165/10 |
| 0221388 | * 12/1983 | (JP) | 165/10 |
| 0064192 | * 4/1985 | (JP) | 165/10 |
| 62-175584 | * 8/1987 | (JP) | 165/10 |

OTHER PUBLICATIONS

Brochure: "ICE–CEL™" by Dunham–Bush: "Tube–in–Tank Ice Thermal Storage System"; Form No. 6874; dated Jan. 1994; Dunham–Bush©, 101 Burgess Road, Harrisonburg, VA 22801.

Brochure: "An Introduction to Off–Peak Air Conditioning OPAC for Commercial Applications"; Calmac Manufacturing Corporation, Box 710, 101 West Sheffield Avenue, Englewood, NJ 07631–0710; No Date.

Bruchure: "Thermal Storage Modules" Type TSM, Models 140 Thru 590; Catalog 1600; McQuay Snyder General; No Date.

\* cited by examiner

*Primary Examiner*—Christopher Atkinson
(74) *Attorney, Agent, or Firm*—Edward J. Brosius; Stephen J. Manich

(57) ABSTRACT

A thermal storage apparatus is disclosed. The apparatus uses a group of heat exchange members immersed in a phase change medium to store coolness by freezing the heat exchange medium. The heat exchange members each include tubular passageways to carry a heat transfer fluid through the apparatus to freeze the phase change material during an ice-forming cycle and to be chilled by the solid phase change material during a melt cycle. The heat exchange members each have substantially continuous opposite surfaces to prevent the solid phase change material from forming an annulus encircling the tubular passageways. During the ice-forming cycle, the solid phase change material forms in complementary sheets or volumes so that during the melt cycle the heat transfer fluid does not gain heat near the outlets. The heat exchange members may be made of a lightweight material, such as plastic.

10 Claims, 10 Drawing Sheets

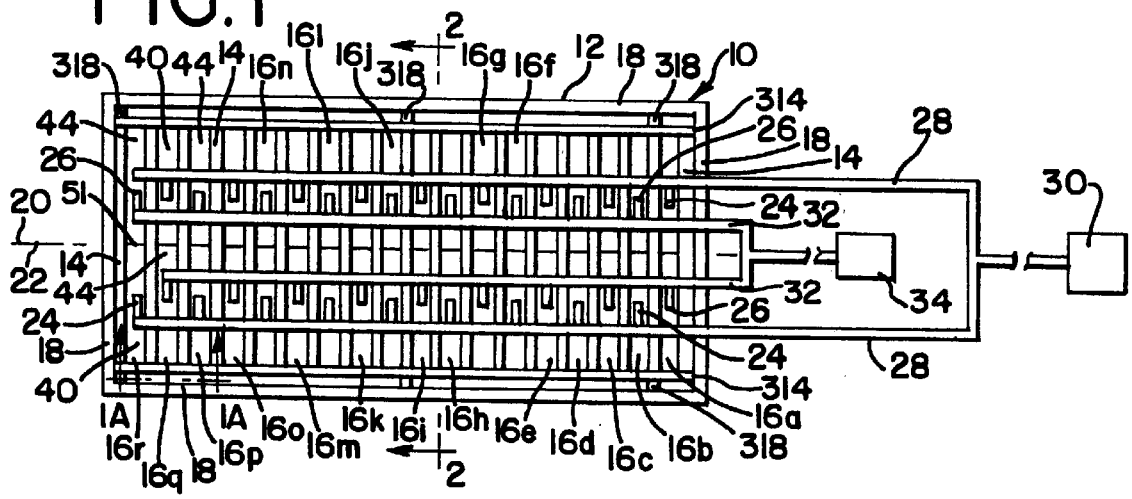
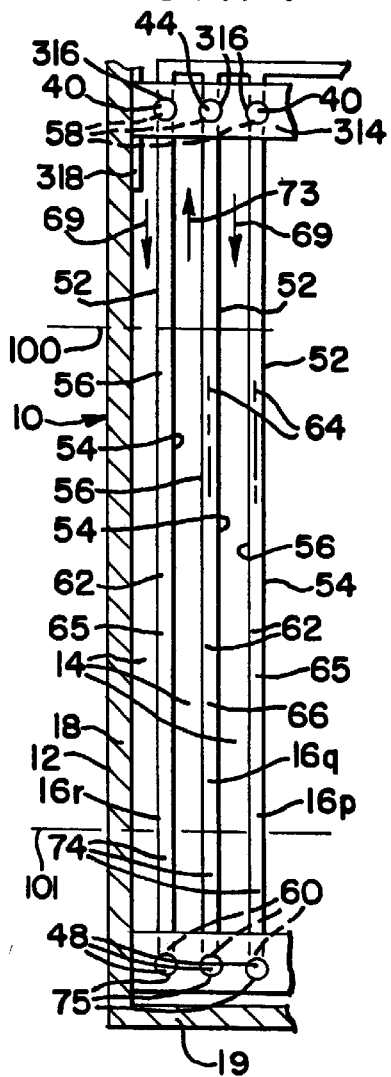
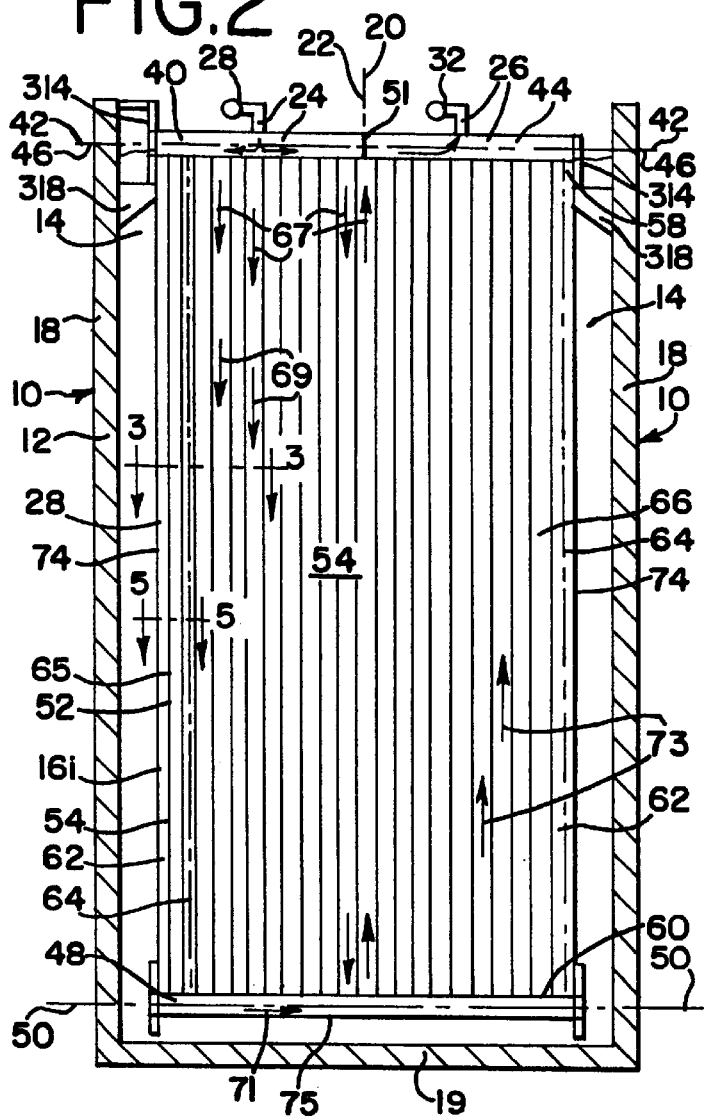

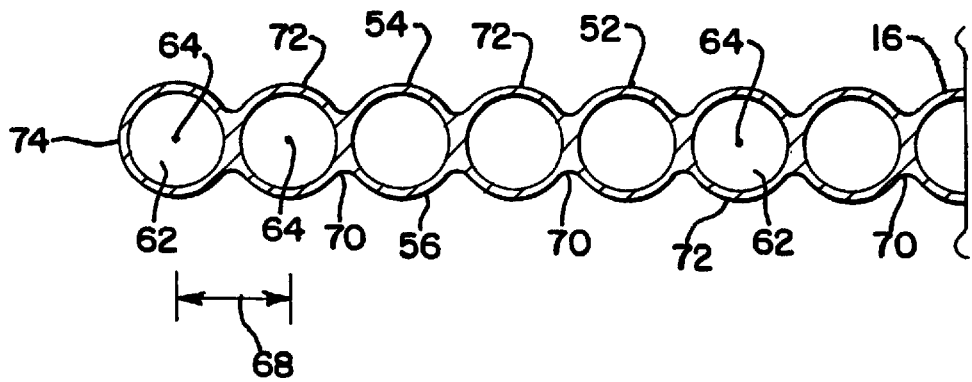
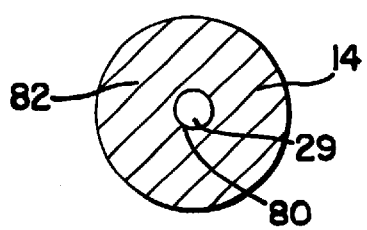
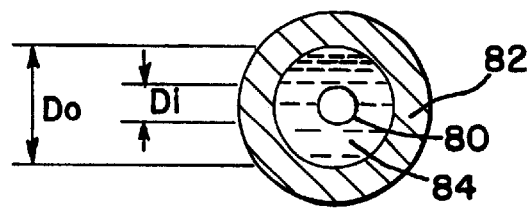
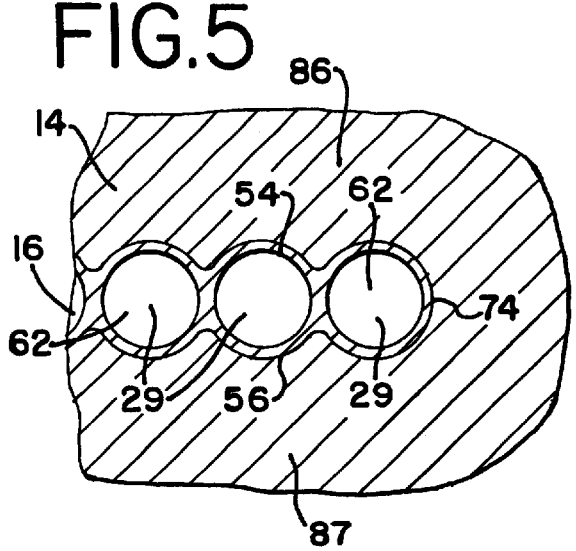
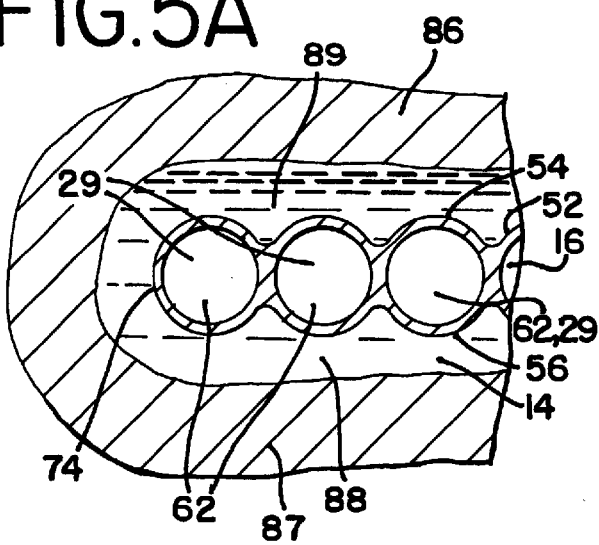

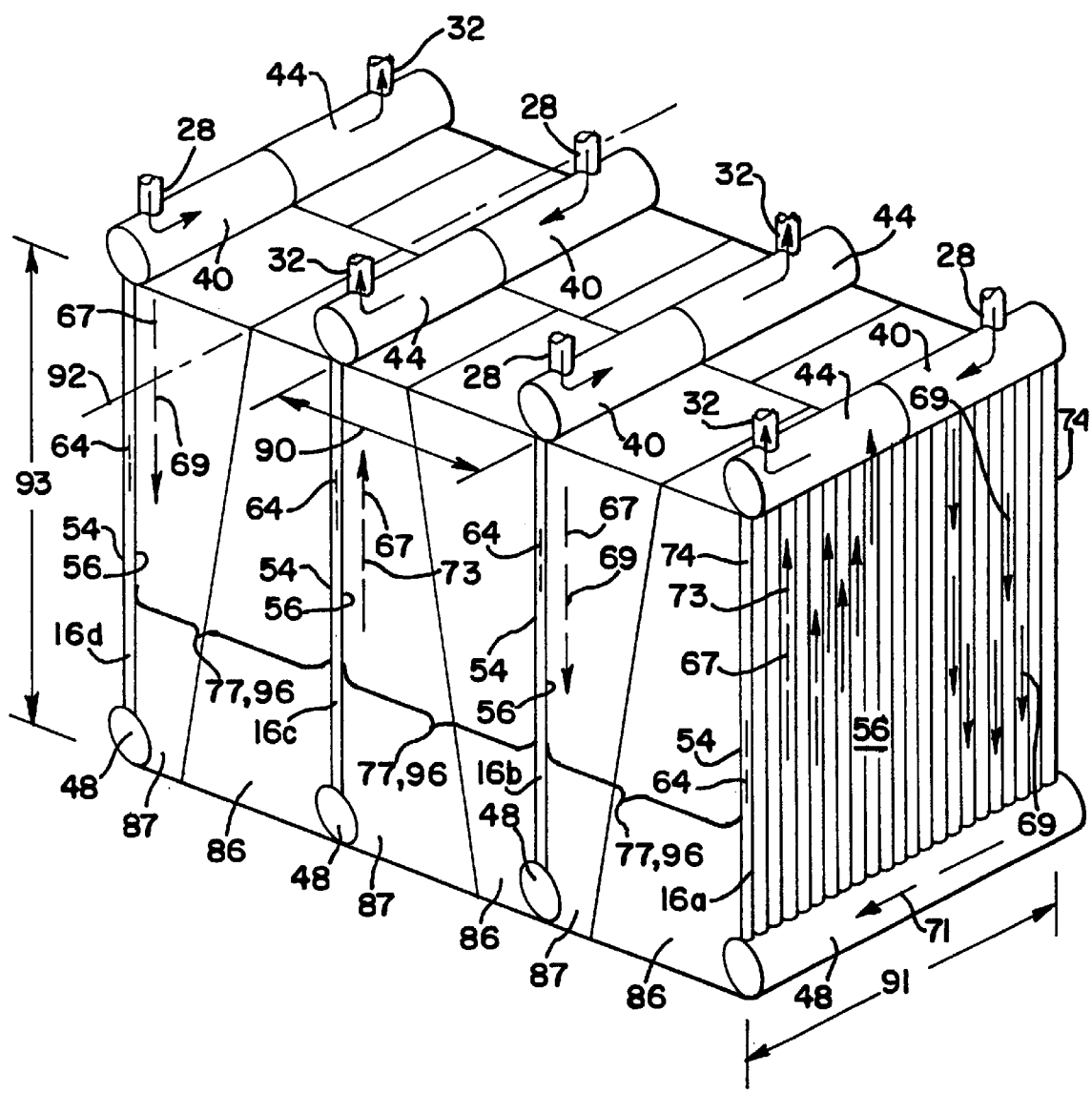

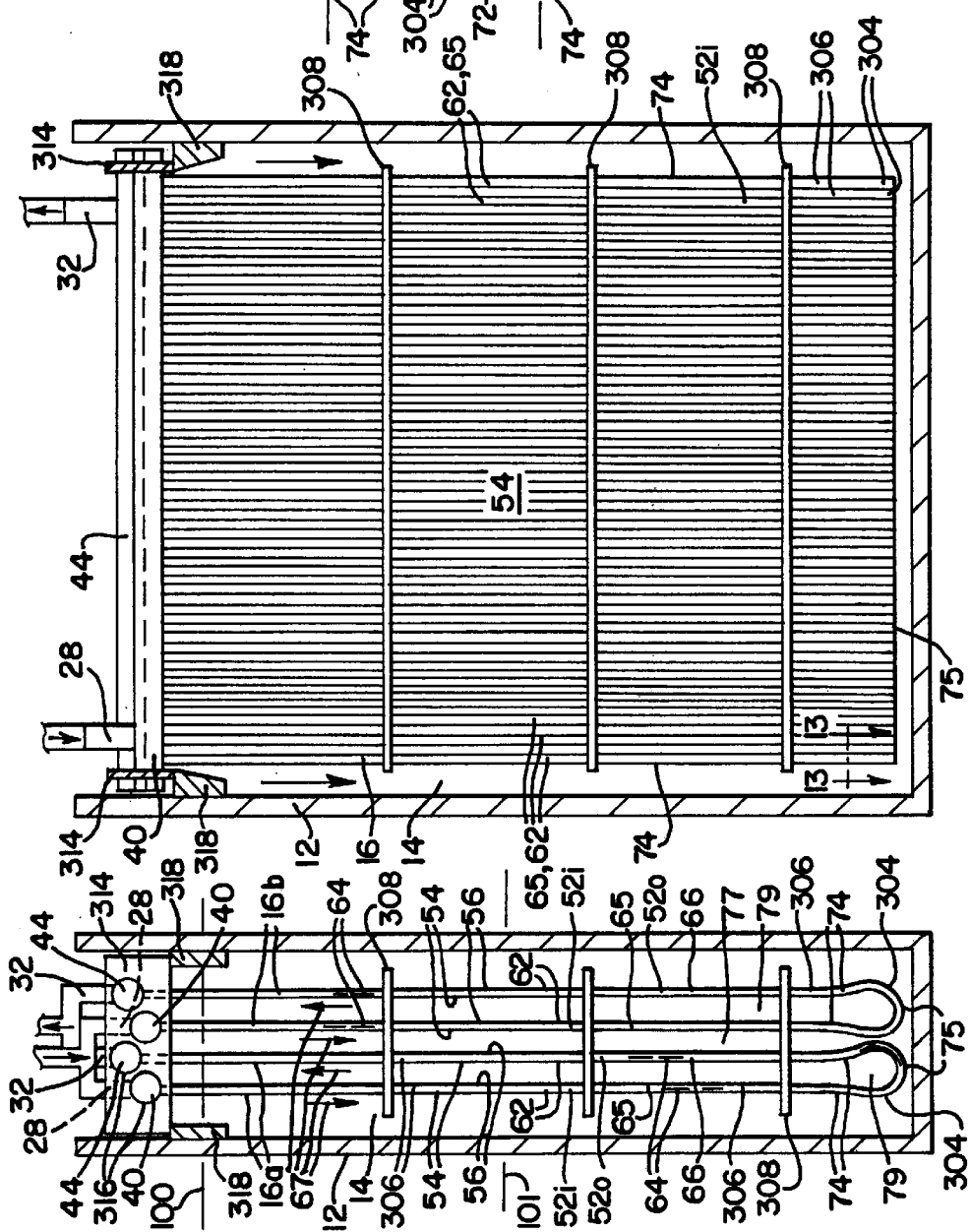

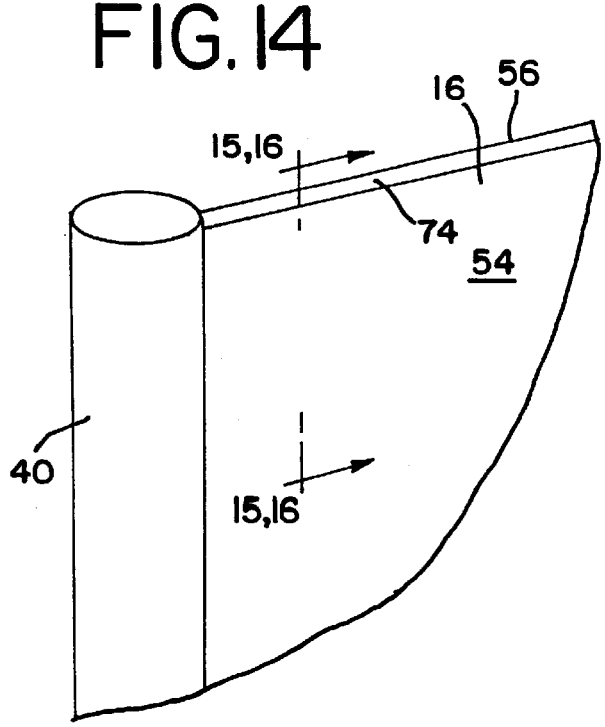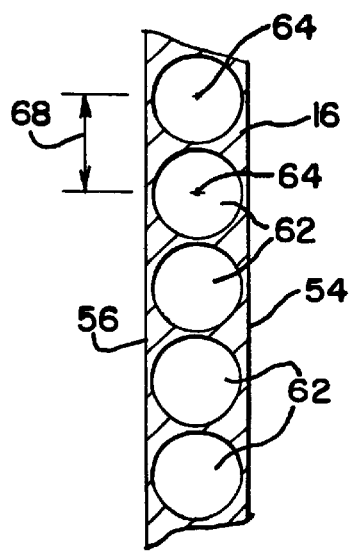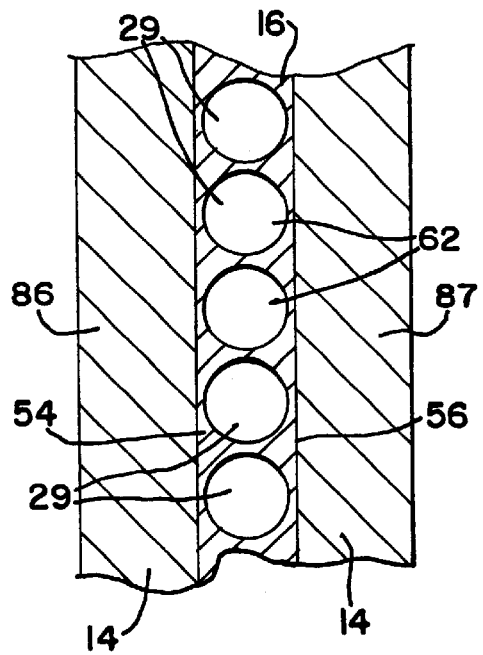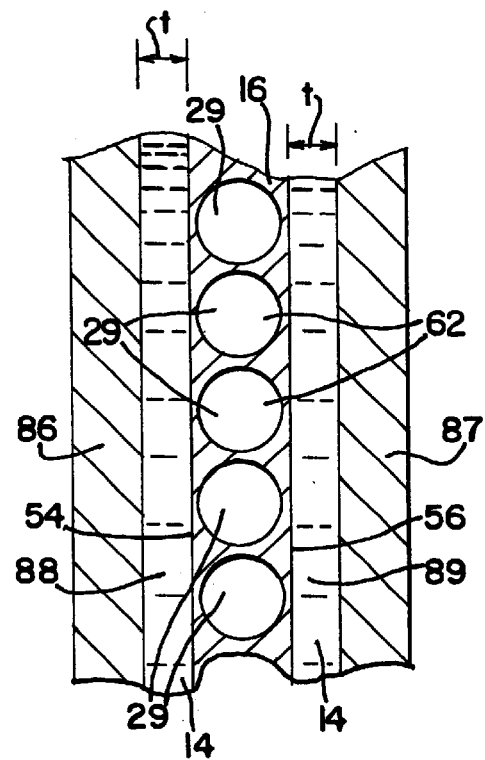

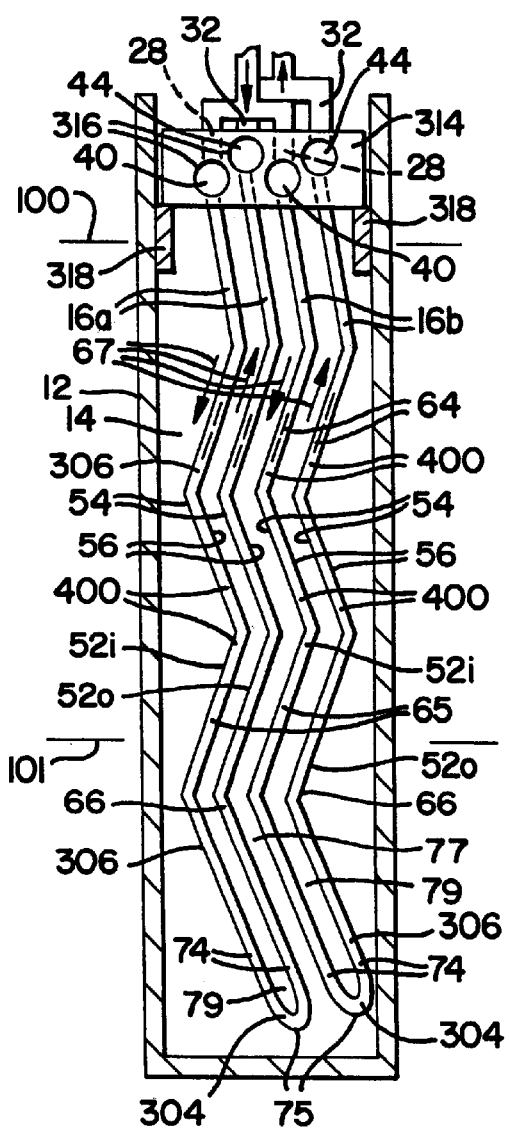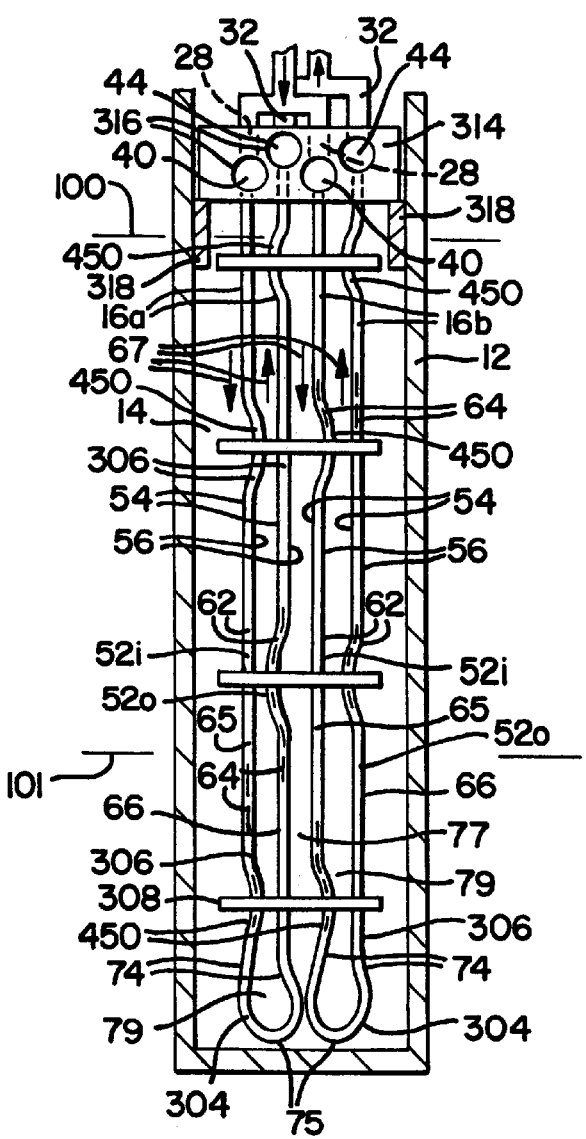

# HEAT EXCHANGE MEMBERS FOR THERMAL STORAGE APPARATUS

BACKGROUND OF THE INVENTION

1. Field of the Invention

The present invention relates to thermal storage apparatuses, and more particularly to heat exchange members for use in thermal storage equipment used to store coolness and release it at a later time.

2. Description of the Prior Art

Thermal storage equipment of the type which forms ice during off peak energy periods and then uses the coolness of the ice to cool a heat transfer fluid is known, for example, from U.S. Pat. No. 4,831,831. Typically, during the ice production cycle, the heat transfer fluid is provided through a mechanical refrigeration unit to an inlet header and then passed through separate tubular passageways immersed in a pool of liquid phase change material, usually water. The heat transfer fluid is usually at a temperature below the freezing temperature of the water. This flow of subfreezing heat transfer fluid acts to form ice from the pool of water, and the ice forms annuluses encircling the individual tubular passageways. Such thermal storage equipment is typically either an internal melt or external melt type of device. In an internal melt device, during the melt cycle, after the heat transfer fluid has been warmed usually by passing through a heat exchanger in an air conditioning or cooling system, the heat transfer fluid is circulated through the individual tubular passageways to cool the fluid. The heat transfer fluid is then returned to the heat exchanger. The heat transfer fluid typically may also travel through a chiller during the melt cycle, and the thermal storage apparatus may be used to further cool the heat transfer fluid below the temperature produced by the chiller. As the heat transfer fluid is cooled in the thermal storage apparatus, the annuluses of ice surrounding the passageways melt. The cooled heat transfer fluid is re-circulated to the heat exchange apparatus, the chiller or both. In an external melt type of device, the cooled phase change material is pumped out of the tank for use outside of the thermal storage apparatus. The heat transfer fluid may vary depending on the type of equipment; for internal melt devices, ethylene or propylene glycol may be used for the heat transfer fluid; for external melt devices, ammonia or R22 may be used.

Different systems of tanks and tubular passageways have been used in such equipment. One problem with such prior thermal storage systems has been that the efficiency of the melt cycle decreases over time. As the annuluses of ice melt, annuluses of water form between the tubes and the annular jackets of ice, decreasing the efficiency of heat transfer over time, resulting in a gradual rise in the temperature of the refrigerant or heat transfer fluid leaving the thermal storage apparatus over time.

Other problems exist in the prior art thermal storage systems. In systems using tubular plastic spirals in round tanks, for example, the spirals and round tanks are commonly large, and problematic to install in a basement of an existing building. In some systems using plastic tubing, the available space in the tank is not used to its full efficiency. Systems using steel coils do not lend themselves to simple knock-down installation, that is, disassembly and re-Assembly on site, and are bulky and thus not readily moved into the basements of existing structures. Steel ice thermal storage apparatuses are also typically heavy and cumbersome to move.

SUMMARY OF THE INVENTION

An object of the present invention is to provide a thermal storage apparatus that is simple to manufacture and assemble, and to provide a thermal storage apparatus that may more efficiently use stored coolness.

BRIEF DESCRIPTION OF THE DRAWINGS

In the figures of the Drawings, like reference numerals identify like components and:

FIG. 1 is a top plan view of a thermal storage apparatus in accordance with the principles of the present invention;

FIG. 1A is a cross-section of part of the thermal storage apparatus of FIG. 1, taken along line 1A—1A of FIG. 1;

FIG. 2 is a cross-section of the thermal storage apparatus of FIG. 1, taken along line 2—2 of FIG. 1;

FIG. 3 is a cross-section of one heat exchange member of the apparatus of FIGS. 1–2, taken along line 3—3 of FIG. 2;

FIG. 4 is a cross-section of a single tubular passageway of a prior art heat exchange tube, shown at the end of the ice-forming cycle;

FIG. 4A is a cross-section of a single tubular passageway of a prior art heat exchange tube, shown during part of the melt cycle;

FIG. 5 is a cross-section of a part of the heat exchange member of FIG. 2, taken along line 5—5 of FIG. 2, shown at the end of the ice-forming cycle;

FIG. 5A is a cross-section of a part of the heat exchange member of FIG. 2, taken along line 5—5 of FIG. 2, shown during part of the melt cycle;

FIG. 7A is a partial perspective view of two heat exchange members aligned for use, showing solid phase change material formed between heat exchange members of the embodiment shown in FIGS. 1–2;

FIG. 11 is a cross-section of the thermal storage apparatus of FIG. 10, taken along line 11—11 of FIG. 10;

FIG. 12 is a cross-section of the thermal storage apparatus of FIG. 10, taken along line 12—12 of FIG. 10;

FIG. 13 is a cross-section of one portion of one heat exchange member of the thermal storage apparatus of FIG. 12, taken along line 13—13 of FIG. 12;

FIG. 14 is a partial perspective view of an alternate heat exchange member that may be used in the present invention;

FIG. 15 is a cross-section of the heat exchange member of FIG. 14, taken along line 15—15 of FIG. 14;

FIG. 16 is a cross-section of a part of the heat exchange member of FIGS. 14–15, taken along line 16—16 of FIG. 14, shown at the end of the ice-forming cycle;

FIG. 16A is a cross-section of a part of the heat exchange member of FIGS. 14–15, taken along line 16—16 of FIG. 14, shown during part of the melt cycle.

FIG. 17 is a is a cross-section of a thermal storage apparatus showing a fifth embodiment of a heat exchange member; and FIG. 18 is a cross-section of a thermal storage apparatus showing a sixth embodiment of a heat exchange member.

DETAILED DESCRIPTION

Figure 6:
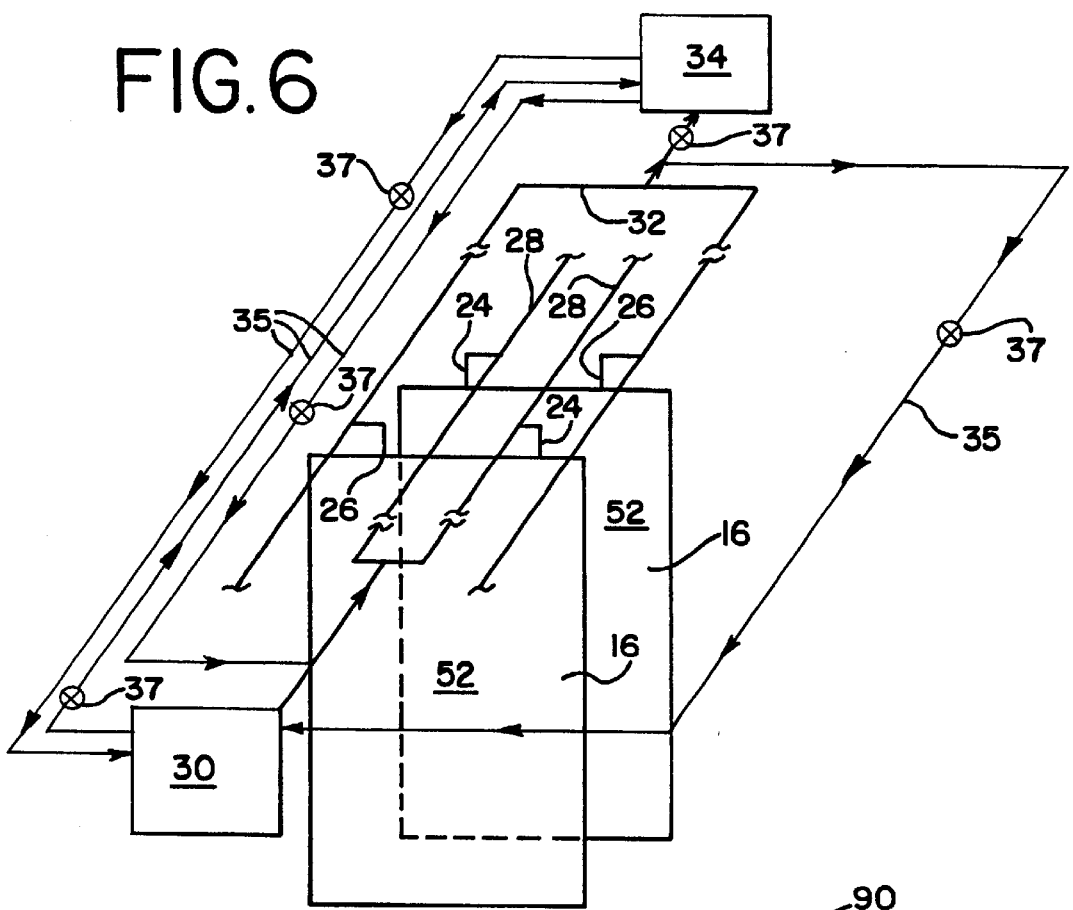
FIG. 6 is a schematic perspective view of two heat exchange members, showing inlet and outlet conduits connected to the members and possible connections to a chiller and air-conditioning apparatus.

A first embodiment of a thermal storage apparatus 10 incorporating the principles of the present invention is shown in FIGS. 1–2. As there shown, the thermal storage apparatus 10 includes a tank 12 that holds a phase change material or medium 14. A group of heat exchange members 16 are immersed in the phase change material 14 in the tank 12. The illustrated thermal storage apparatus is of the internal melt type, although it should be understood that the teachings of the present invention are not limited to internal melt thermal storage devices.

In the following description, several different embodiments of the invention are described with reference to the drawings. Like reference numerals have been used for like parts in describing the different embodiments, although the parts may have some different characteristics in each embodiment, as described below.

Figure 10:
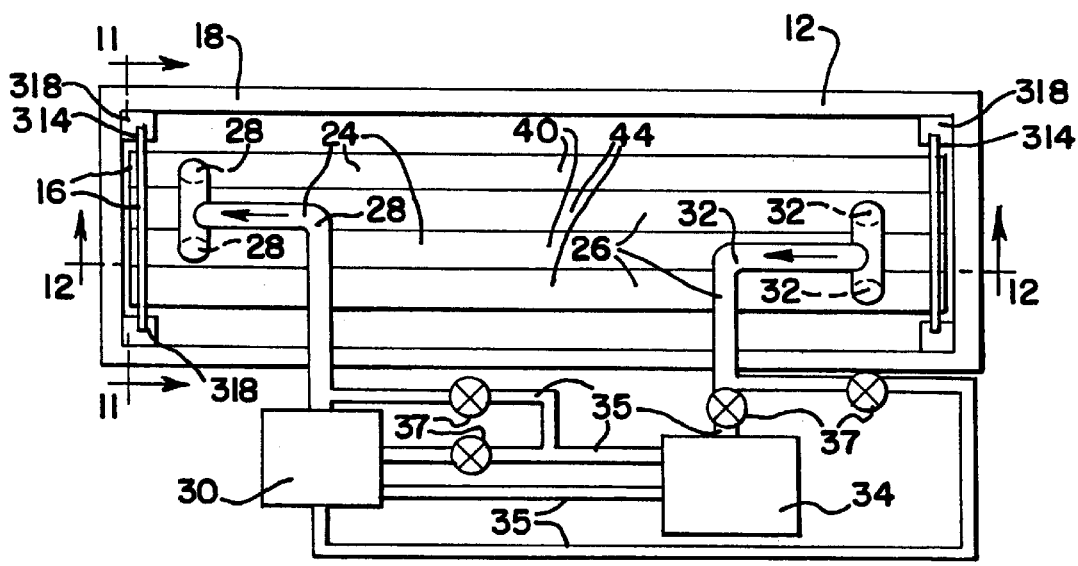
FIG. 10 is a top plan view of another embodiment of a thermal storage apparatus of the present invention.

The tank 12 may be rectangular as shown in FIGS. 1 and 10. This rectangular shape is an efficient one for optimized use of space for thermal storage. The illustrated tank 12 has vertical side walls 18, a bottom 19 and a central vertical plane 20, and may be made of standard materials, such as steel or any structurally acceptable alternative, such as aluminum or fiber reinforced material such as fiberglass, and may be of double-walled construction, with standard insulation between the walls, as will be understood by those versed in the art. The tank may have an insulating cover (not shown), and may have space to allow for expansion of the phase change material 14 during freezing. The tank 14 may be made of separate components that can be assembled on site.

The phase change material 14 may be any standard material used for this purpose in standard thermal storage systems, such as those disclosed in U.S. Pat. No. 5,109,920 (1992) to Merryfull and U.S. Pat. No. 4,294,078 to Mac-Cracken. A typical phase change material suitable for use in the illustrated thermal storage apparatus is water.

The group of heat exchange members 16 are immersed in the phase change material 14 in the tank 12. In the first illustrated embodiment, the heat exchange members 16 comprise elongate panels, and there are 18 heat exchange members 16 in the tank, designated 16a–16r in FIG. 1. However, it should be understood that the number, shape and arrangement of heat exchange members and size and shape of the tank may be varied according to design parameters and space requirements for the system. For example, in the embodiment of FIGS. 10–12, there are fewer heat exchange members 16, designated 16a–16b, and a smaller tank 12.

All of the heat exchange members 16a–16r of the first illustrated embodiment are disposed perpendicular to one of the tank's central vertical planes, shown at 20 in FIGS. 1–2.

In the first illustrated embodiment, each heat exchange member 16 has a vertical center axis 22, aligned along a central vertical plane 20 of the tank, with the heat exchange members each running perpendicular to the longer walls of the rectangular tank. However, it should be understood that the heat exchange members could be disposed parallel to the longer walls of a rectangular tank, as in the embodiment of FIGS. 10–12.

One heat transfer member 16 is described in detail below. It should be understood that the following description may apply as well to the remaining heat exchange members used in the thermal storage apparatus, although alternate heat exchange members are turned 180°.

Each heat exchange member 16 has an inlet 24 and an outlet 26, and provides a flow path that connects the inlet 24 and outlet 26 of each heat exchange member for heat transfer fluid 29 to travel through the heat exchange member. The inlet 24 of each heat exchange member 16 is connected through an inlet conduit 28 to a source 30 of heat transfer fluid 29, and the outlet 26 of each heat exchange member 16 is connected through an outlet conduit 32 to a heat exchange apparatus 34, although the outlet conduit may also be connected to the source 30 of the heat transfer fluid, as illustrated in FIGS. 6 and 10.

The source 30 of heat transfer fluid is typically a chiller apparatus. In normal operation, the chiller 30 will cool the heat transfer fluid 29 to a temperature below the freezing point of the phase change material 14 during off-peak energy usage times. The chilled heat transfer fluid 29 is then circulated through the heat exchange members 16. As the heat transfer fluid 29 circulates through each heat exchange member 16, the phase change material 14 is cooled and freezes into solid form, such as ice. During this ice-forming cycle, the heat transfer fluid 29 exiting through the outlet conduit 32 may be returned to the chiller 30 for cooling and re-circulation to continue the ice-forming process. When it is desired to use the stored coolness of the thermal storage apparatus 10, for example, during times of peak energy usage, before the heat transfer fluid 29 is circulated through a heat exchange apparatus 34, such as an air-conditioning system, it may be circulated through the thermal storage apparatus 10 first, to cool the heat transfer fluid 29 for use in air-conditioning. During this use cycle, the stored solid phase change material, such as ice, melts, and the temperature of the heat transfer fluid 29 drops as the stored ice cools the fluid. The stored coolness of the thermal storage apparatus may be used to supplement the effect of a chiller 30 on the heat transfer fluid 29 or to replace the chiller 30 during some or all of the peak energy use period. Examples of lines of conduits 35 and valves 37 for such operations are shown in FIGS. 6 and 10.

In the first illustrated embodiment, in each heat exchange member 16 the inlet 24 includes an inlet header 40 having a central longitudinal axis 42. The outlet of each heat exchange member 16 includes an outlet header 44 with a central longitudinal axis 46 parallel to the central longitudinal axis 42 of the inlet header 40. The illustrated inlet and outlet headers 40, 44 have co-linear axes 42, 46, and are cylindrical in shape. The inlet and outlet headers 40, 44 may be made of two separate closed-end hollow cylinders placed end-to-end, along a fluid-tight joint 51, for example, or a single long hollow cylinder could be used, with a sealing disc placed midway between the ends of the single cylinder to form a fluid-tight joint to block fluid flow between the inlet header portion and outlet header portion, and the ends of both portions then sealed. Other structures are possible: for example, one of the headers could be vertically or horizontally offset from the other. The headers 40, 44 may be made of any suitable material. A plastic material, such as polyvinyl chloride (PVC), polypropylene, or polyethylene is preferred to make the headers lightweight, although metal could also be used. The headers are preferably stiff enough to support the weight of the heat exchange member without buckling.

Each of the first illustrated heat exchange members 16 also includes a lower connecting header 48 having a central longitudinal axis 50. The lower connecting header 48 is spaced from the inlet header 40 and outlet header 44, and its central longitudinal axis 50 is parallel to the central longitudinal axes 42, 46 of the inlet and outlet headers 40, 44. It may be made of the same material as the inlet and outlet headers, and may be cylindrical in shape, with sealed ends. The lower connecting header 48 is part of the flow path for the heat transfer fluid 29.

In the first illustrated embodiment, all of the headers 40, 44, 48 are connected to a heat exchange divider panel 52. The illustrated continuous heat exchange divider panel 52 has continuous opposite surfaces 54, 56 in contact with the phase change material 14 in the tank 12. An upper end 58 of the heat exchange divider panel 52 is connected to the inlet header 40 and outlet header 44, and a lower end 60 is connected to the lower connecting header 48. A plurality of tubular fluid passageways 62 are within the continuous heat exchange divider panel 52 between the substantially continuous opposite surfaces 54, 56, and the tubular fluid passageways 62 define at least parts of the substantially continuous opposite surfaces 54, 56. In this embodiment, the tubular fluid passageways 62 are linear and have parallel central longitudinal axes 64 lying in the same plane as the central longitudinal axes 42, 46, 50 of the inlet header 40, outlet header 44 and lower connecting header 48. The tubular fluid passageways 62 in the first embodiment include a plurality of linear tubular inlet passageways 65 and a plurality of adjacent linear tubular outlet passageways 66, all between the continuous surfaces 54, 56 of the heat exchange panel 52. As shown in FIGS. 2–3, adjacent tubular passageways 62 are laterally connected to each other along their entire lengths, with one tubular inlet passageway 65 being laterally connected along its entire length to one adjacent tubular outlet passageway 66, to define the continuous opposite surfaces 54, 56 of the heat exchange member. The tubular passageways 62 may be laterally connected as illustrated through any conventional means, such as by adhering individual tubes together with a bonding material, by extruding a group of tubes together, or by vacuum forming, for example. If the divider panel 52 or passageways 62 of the heat exchange member 16 are made of polypropylene, elongate individual tubes could be laterally connected by heat fusion; if made of PVC, elongate individual tubes could by glued together. Preformed sheets of suitable lightweight plastic material could also be vacuum formed and then bonded together for the embodiment of FIG. 9, discussed below. If the headers 40, 44 and panel 52 are made of metal, standard connection methods may be used. Thus, any manner of connection may be used, depending upon the material used for the individual tubes. The number of passageways to be laterally connected into the panel may vary: there may be for example, twenty, fifty, one-hundred or more tubes, each tube laterally connected to the adjacent tube or tubes.

It should be understood that it is not necessary that the tubular passageways 62 be circular in cross-section as shown. It should also be understood that the opposite surfaces 54, 56 of the divider panel 52 may be substantially rather than totally continuous: there may be some breaks between adjacent tubular passageways 62, or at other locations on the divider panel 52, but the adjacent tubular passageways are preferably laterally connected along the majority of their lengths.

In addition, it is not necessary that the entire heat exchange member 16 be immersed in the phase change material 14. The inlet and outlet headers 40, 44 may be placed above the level of the phase change material, for example. In some applications, only portions of the passageways 62 will be immersed in the phase change material 14, in which case the lateral connections between adjacent passageways are preferably along at least a substantial portion of the lengths of the passageways immersed in the phase change material.

Each tubular inlet passageway 65 is connected to be in fluid communication with the inlet header 40 and with the lower connecting header 48, and each tubular outlet passageway 66 is connected to be in fluid communication with the outlet header 44 and the lower connecting header 48. Thus a flow path, generally designated 67 in FIG. 2, is provided for the heat transfer fluid 29. The flow path 67 leads from the inlet header 40 to the inlet passageways 65, and includes a downward flow path 69 through the inlet passageways 65 to the lower connecting header 48, a connecting flow path 71 through the lower connecting header, and an upward flow path 73 through the outlet passageways 66 to the outlet header 44. Thus, the heat transfer fluid flows in opposite directions in the inlet and outlet passageways 65, 66.

The connections between the passageways 62 and the headers 40, 44, 48 may be made through mating holes or slits formed in the headers 40, 44, 48 to receive the ends 58, 60 of the heat exchange divider panel 52, with suitable sealing material to provide a fluid-tight connection. The sealing material and method should be selected based upon the material used for the headers and heat exchange member 16; if polypropylene is used, the sealing may be accomplished through heat fusion; if PVC is used, glue may be used. The heat exchange divider panel 52 may be the solar energy collecting panel disclosed in U.S. Pat. No. 4,098,331 (1978) to Ford et al., and may be made and assembled as disclosed in that patent, and of the materials disclosed in that patent, the disclosure of which is incorporated by reference herein in its entirety.

Both the inlet and outlet passageways 65, 66 of the first illustrated heat exchange member 16 have inner walls that are circular in cross-section, comprising elongate cylinders. As shown in FIG. 3, the opposite surfaces 54, 56 of the first illustrated heat exchange member 16 have parallel valleys 70 and rounded ridges 72 running the length between the inlet and outlet headers 40, 44 and the lower connecting header 48. The rounded ridges 72 correspond with the shapes of the tubular passageways 62 and the valleys 70 correspond with the lateral connections between adjacent tubular passageways. Thus, the opposite surfaces 54, 56 of the heat exchange divider panel 52 portion of the heat exchange member 16 of the first illustrated embodiment have a corrugated appearance. However, it should be understood that the present invention is not limited to such a divider panel. As illustrated in FIGS. 14–16, the opposite surfaces 54, 56 of the heat exchange member 16 could instead be planar, for example, with the internal tubular passageways 62 having a circular cross-section or some other shape.

In the first illustrated embodiment, the tubular inlet and outlet passageways 65, 66 have outer diameters of about ¼ inch, wall thicknesses of about ¹⁄₃₂ inch, and inner diameters of about ³⁄₁₆ inch; the distance, shown at 68 in FIGS. 3, 13 and 15, between the central longitudinal axes 64 of adjacent passageways 62 is between about 95–100% of the outer diameters or dimensions of the tubes. It should be understood that other sizes and thicknesses may be used. For example, the tubular passageways could have an outer diameter of 0.15 inch and wall thicknesses of from 10–40 mils. Other shapes of tubular passageways could also be used, although the cylindrical tubular passageways may be preferred for structural strength.

Figure 8:
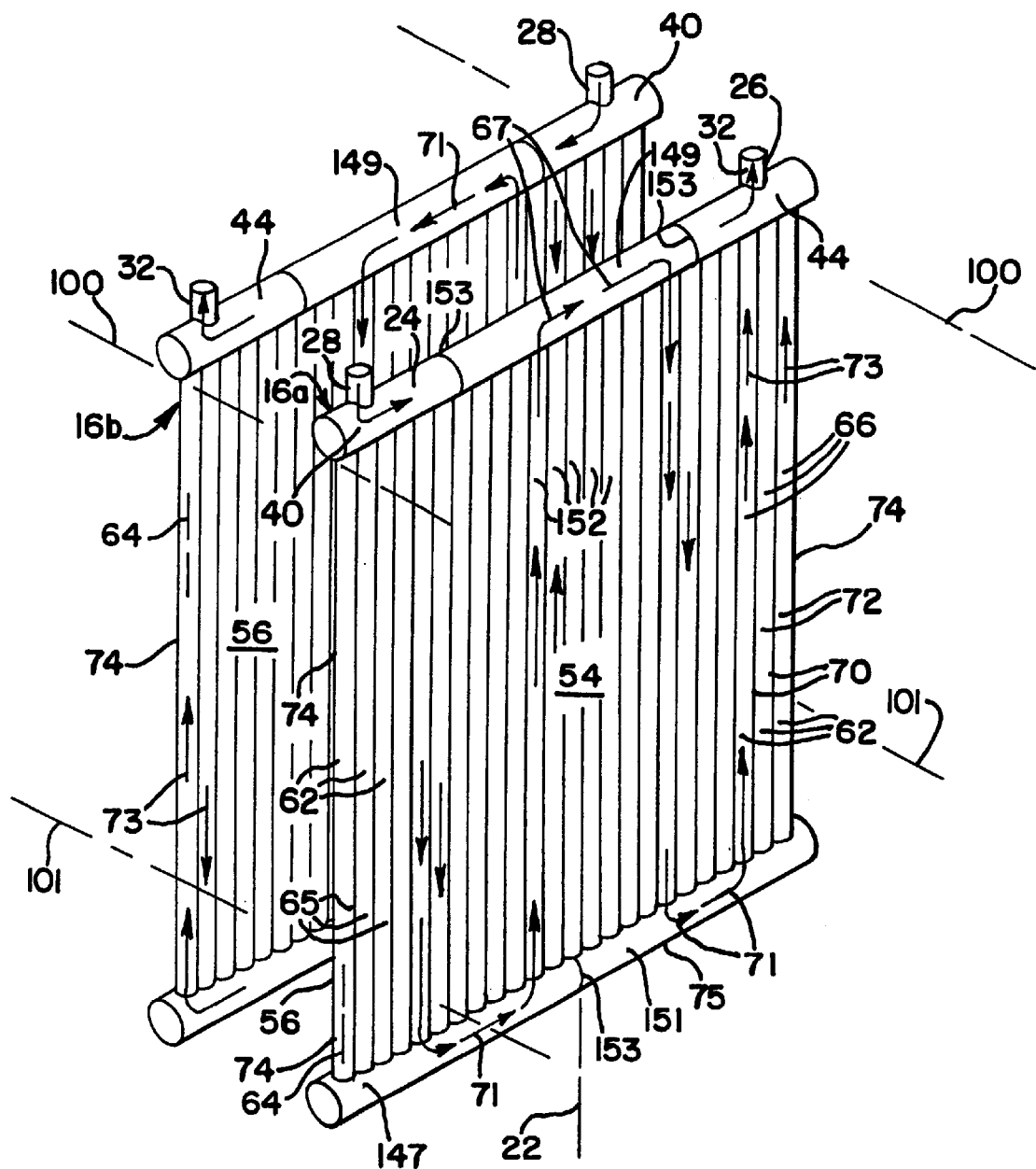
FIG. 8 is a perspective view of an alternate embodiment of a heat exchange member, showing two heat exchange members aligned for use.

A second embodiment of a heat exchange member 16 for a thermal storage apparatus is illustrated in FIG. 8. It should be understood that like reference numerals have been used for parts like those described above for the first embodiment. In FIG. 8, two identical heat exchange elements are shown, designated 16a and 16b, although it should be understood that the thermal storage apparatus may include additional elements, as in the embodiment of FIG. 1. One heat exchange member 16 is described in detail below, and it should be understood that the following description applies as well to the other heat exchange members in the thermal storage apparatus. As shown in FIG. 8, each heat exchange member 16 has an inlet 24 including an inlet header 40 and an inlet conduit 28 and an outlet 26 including an outlet header 44 and an outlet conduit 32. The FIG. 8 embodiment has opposite substantially continuous surfaces 54, 56. There are also a plurality of linear passageways 62. The inlet header 40 is on one side of a central vertical axis 22 and the outlet header 44 is on the opposite side of the vertical axis 22. The passageways 62 include linear inlet passageways 65 and linear outlet passageways 66. In this embodiment, the flow path 67 includes a first lower connecting header 147 spaced from the inlet header 40, an upper connecting header 149 between the inlet header 40 and outlet header 44, a second lower connecting header 151 spaced from the inlet header 40, outlet header 44 and upper connecting header 149, and the passageways 62 include connecting passageways 152. The longitudinal axes 42, 46 of the inlet header 40 and outlet header 44 are co-linear and the upper connecting header 149 shares these axes. The inlet passageways 65 are adjacent to each other and connect the inlet header 40 to the first lower connecting header 147. The first lower connecting header 147 is in fluid communication with a first group of adjacent connecting passageways 152 that connect the first lower connecting header 147 and the upper connecting header 149. A second group of the connecting passageways 152 are adjacent to each other and connect the upper connecting header 149 and the second lower connecting header 151. The outlet passageways 66 connect the second lower connecting header 151 and the outlet header 44.

In the FIG. 8 embodiment, the first and second lower connecting headers 147, 151 are separated by a fluid tight joint 153, sealing disc or the like, as are the inlet header 40 and upper connecting header 149 and upper connecting header 149 and outlet header 44. The FIG. 8 embodiment provides a more convoluted path of travel for the heat transfer fluid, and the flow path may be further modified by further dividing the upper and lower connecting headers. The illustrated flow path 67 includes downward flow paths 69, connecting flow paths 71 and upward flow paths 73 for the heat exchange fluid 29. The direction of flow in the inlet passageways 65 is opposite to the direction of flow in the outlet passageways 66. The heat exchange members in the FIG. 8 embodiment may be made of suitable plastic in a manner substantially similar to that described for the first embodiment, and the headers may be made as in the FIG. 1 embodiment. The passageways may also have a cross-section similar to that shown in FIG. 3; alternatively, a flat panel may be used as illustrated in FIGS. 14–16 so that the substantially continuous opposite surfaces 54, 56 may be substantially planar.

Figure 9:
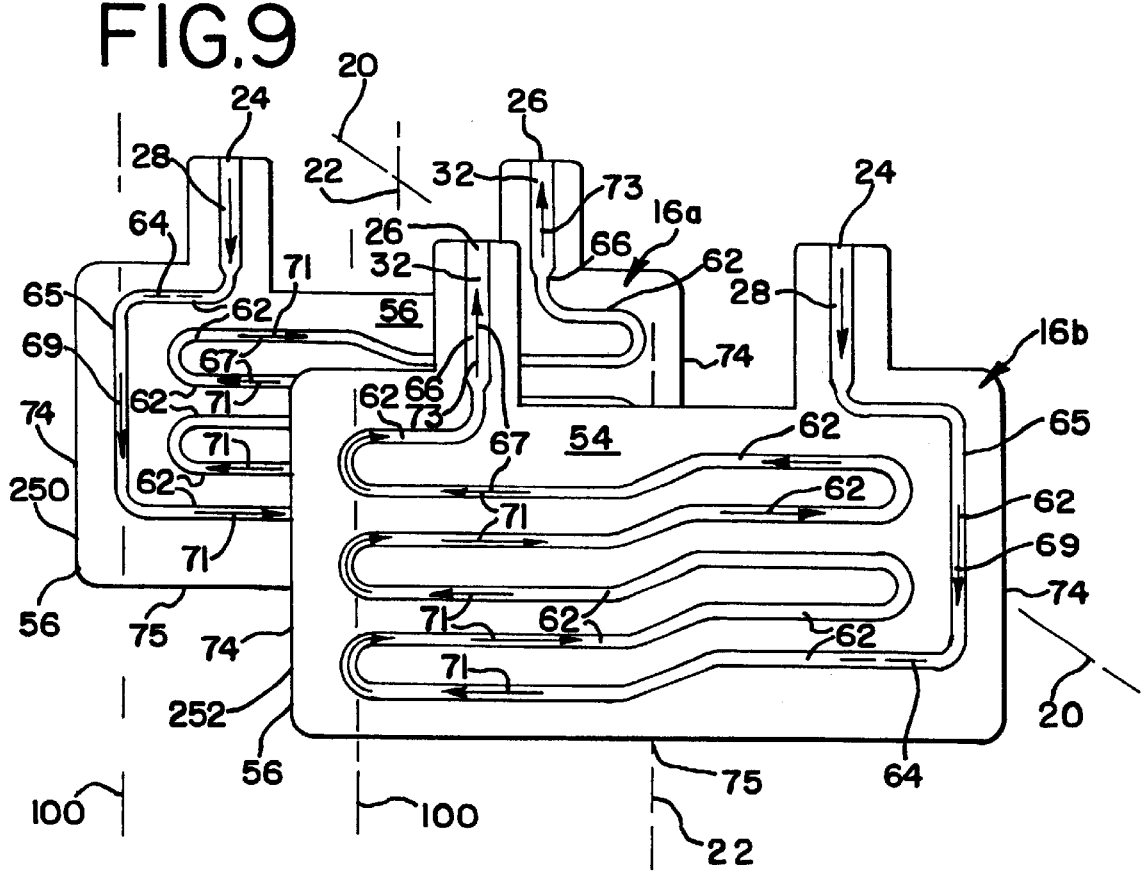
FIG. 9 is a perspective view of an alternate embodiment of a heat exchange member, showing two heat exchange members aligned for use.

Another alternate embodiment of heat exchange members 16 for a thermal storage apparatus is illustrated in FIG. 9. It should be understood that like reference numerals have been used for parts like those described above for the first and second embodiments. In FIG. 9, two identical heat exchange elements, designated 16a and 16b, are provided, although it should be understood that the thermal storage apparatus may include additional elements, as in the embodiment of FIG. 1, for example. One of the heat exchange members 16 is described in detail below, but it should be understood that the following description applies as well to the other heat exchange members that are in the thermal storage apparatus, although, as in the first and second embodiments, alternate heat exchange members are turned 180° in the tank. As shown in FIG. 9, each heat exchange member 16 has an inlet 24 comprising an inlet conduit 28, an outlet 26 comprising an outlet conduit 32, opposite substantially continuous surfaces 54, 56, and a plurality of tubular passageways 62 defining a flow path 67 from the inlet 24 to the outlet 26. In this embodiment, the tubular passageways 62 are connected end-to-end between the inlet conduit 28 and the outlet conduit 32 to provide a single continuous flow path. In the illustrated embodiment, the single continuous flow path has a circuitous pattern with a serpentine section. The flow path 67 includes downward flow paths 69, connecting flow paths 71 and upward flow paths 73 for the heat transfer fluid 29. The downward direction of the flow in the inlet passageway 65 is opposite to the upward direction of the flow in the outlet passageway 66. A web 200 of plastic material extends between portions of the passageways 62 in the flow path 67. Together, the passageways 62 and web 200 comprise the divider panel 52, and the inlet conduit 28 and outlet conduit 32 are formed as part of each panel.

In the FIG. 9 embodiment, the tubular passageways 62 are preformed in fixed positions, and the interconnected sections of the tubular passageway are disposed to lead in different directions. The FIG. 9 embodiment may be made of any suitable material, such as PVC or plastic vacuum formed and bonded together to produce each heat exchange member panel.

A fourth embodiment of heat exchange members 16 in a thermal storage apparatus 10 is illustrated in FIGS. 10–12. It should be understood that like reference numerals have been used for parts like those described above for the first, second and third embodiments, In FIGS. 10–11, two identical heat exchange elements, designated 16a and 16b, are provided, although it should be understood that the thermal storage apparatus may include additional heat exchange elements, as in the embodiment of FIG. 1, for example. One of these heat exchange elements 16 is described in detail below, but it should be understood that the following description applies to all of the heat exchange members that are in the thermal storage apparatus. In the fourth embodiment, each heat exchange member 16 also has an inlet 24 comprising an inlet header 40 and an outlet 26 including an outlet header 44. The heat exchange member also has a plurality of tubular passageways 62 that define substantially continuous opposite surfaces 54, 56 and that define a flow path 67 from the inlet 24 to the outlet 26. The passageways 62 include linear inlet passageways 65 and linear outlet passageways 66. The inlet passageways 65 and inlet header 40 have central longitudinal axes 64, 42 that lie in a common vertical plane 300, and the outlet passageways 66 and outlet header 44 have central longitudinal axes 64, 46 that lie in a common vertical plane 302 spaced from and parallel to the plane 300 of the inlet passageways, as shown in FIG. 11. Non-linear connecting fluid passageways 304 extend between the inlet passageways 65 and the outlet passageways 66. In the end view of FIG. 11, the non-linear connecting passageways 304 are generally U-shaped, although other shapes may be used for these connecting passageways. The inlet and outlet passageways 65, 66 are laterally connected along at least substantial parts of their lengths, forming an inlet divider panel 52i and a spaced outlet divider panel 52o joined by the connecting passageways. In the illustrated embodiment, a continuous tube 306 forms each inlet, connecting and outlet passageway, 65, 304, 66 and adjacent continuous tubes 306 are laterally connected along their entire lengths. A plurality of laterally-connected tubes 306 form each divider panel 52.

As in the first embodiment, the distance 68 in FIG. 13 between the central longitudinal axes 64 of adjacent inlet passageways 65 and between the central longitudinal axes 64 of adjacent outlet passageways 66 is between about 95–100% of the outer diameters or dimensions of the tubes. In addition, as in the first embodiment, the opposite surfaces 54, 56 of the fourth illustrated heat exchange member 16 have parallel valleys 70 and rounded ridges 72 running the length between the inlet and outlet headers 40, 44. The rounded ridges 72 correspond with the shapes of the tubular inlet and outlet passageways 65, 66 and the valleys 70 correspond with the lateral connections between adjacent tubular passageways. Thus, the opposite surfaces 54, 56 of the heat exchange divider panel 52 portion of the heat exchange member 16 of the fourth illustrated embodiment have a corrugated appearance.

The laterally-connected tubes 306 of the heat exchange members 16 illustrated in FIGS. 10–12 are made of a flexible material. The tops of the tubes 306 may be connected to the inlet header 40 and the bottoms of the tubes may be connected to the outlet header 44 in the same manner as described for the first embodiment. The inlet and outlet header may be made of the same material as described for the first embodiment, and are preferably stiff enough to support the entire weight of the heat exchange member. Each heat exchange member 16 may be the solar energy collecting panel disclosed in U.S. Pat. No. 4,098,331 (1978) to Ford et al., and may be made and assembled as disclosed in that patent, and of the materials disclosed in that patent. The flexible panel may be folded substantially in half, bringing the outlet header 44 up toward the inlet header 40, thus forming the U-shaped connecting passageways 304 as the panel is folded. To assure proper positioning of the inlet and outlet tubular passageways, a plurality of spacer plates 308 are provided. The spacer plates 308 hold the tubular inlet passageways 65 at a desired distance from the tubular outlet passageways 66 of the same heat exchange member 16a or an adjacent heat exchange member 16b. The spacer plates 308 may also be sized and shaped to maintain a desired separation between the tubular passageways 62 and the side walls 18 of the tank 12. The spacer plates 308 may be made of metal such as galvanized steel or stainless steel or any other suitable material.

A fifth alternative embodiment of a heat exchange apparatus with two heat exchange members 16a, 16b is illustrated in FIG. 17. Each heat exchange member 16a, 16b of the FIG. 17 embodiment is similar to the heat exchange members shown in the fourth embodiment of FIGS. 11–13, except that the tubular inlet passageways 65 and tubular outlet passageways 66 are not straight, but comprise a plurality of straight segments 400 connected end to end at angles. A sixth alternative embodiment of a heat exchange apparatus with two heat exchange members 16a, 16b is illustrated in FIG. 18. Each heat exchange member 16a, 16b of the FIG. 18 embodiment is similar to the heat exchange members of the fourth embodiment of FIGS. 11–13, except that the tubular inlet passageways 65 and tubular outlet passageways 66 include curved portions 450 so that the distance between the centerlines 64 of the inlet and outlet passageways is not uniform.

In all of the illustrated embodiments, each of the illustrated heat exchange members 16 has side edges 74 that are spaced from the vertical walls 18 of the tank and a bottom 75 that is spaced from the bottom 19 of the tank. The liquid phase change material 14 may flow around the side edges 74 and bottom 75 of the heat exchange member. In the embodiments of FIGS. 1 and 8, the bottom 75 is defined by the bottom of the lower connecting header 48 and lower connecting headers 147, 151. In the embodiment of FIG. 9, the bottom 75 is formed by an edge portion of the web 200. In the embodiment of FIGS. 11–12 and 17–18, the bottom 75 is formed by the lowermost portion of the non-linear connecting passageways 304.

Figure 7:
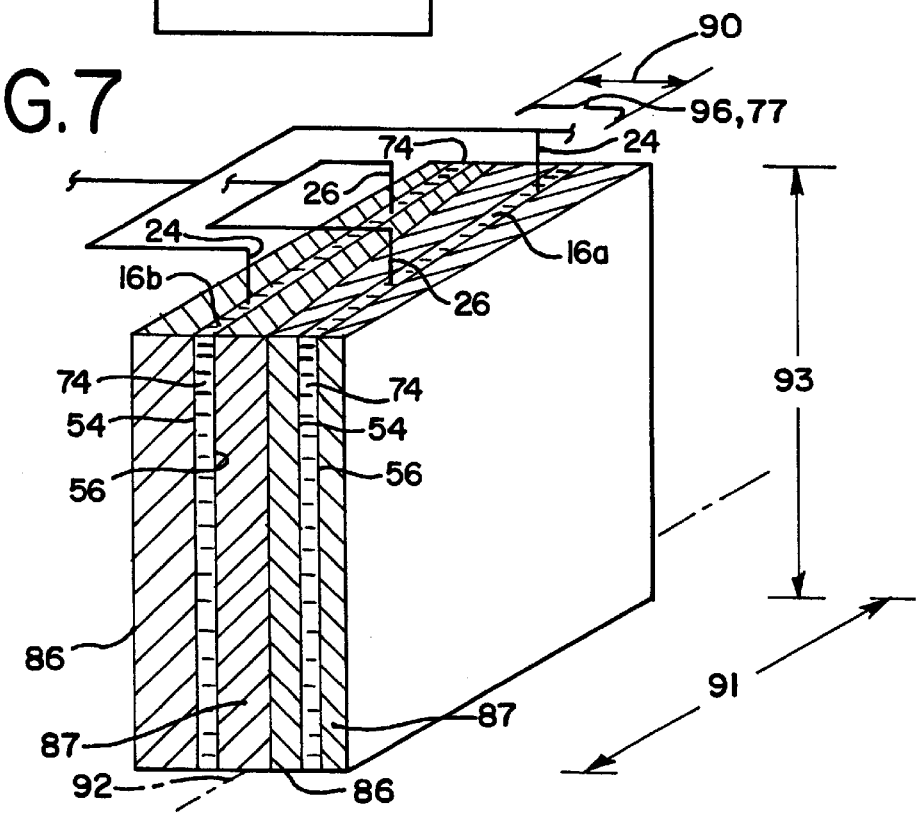
FIG. 7 is a partial perspective view of two heat exchange members aligned for use, showing solid phase change material formed between the heat exchange members of the FIG. 9 embodiment.
Figure 7B:
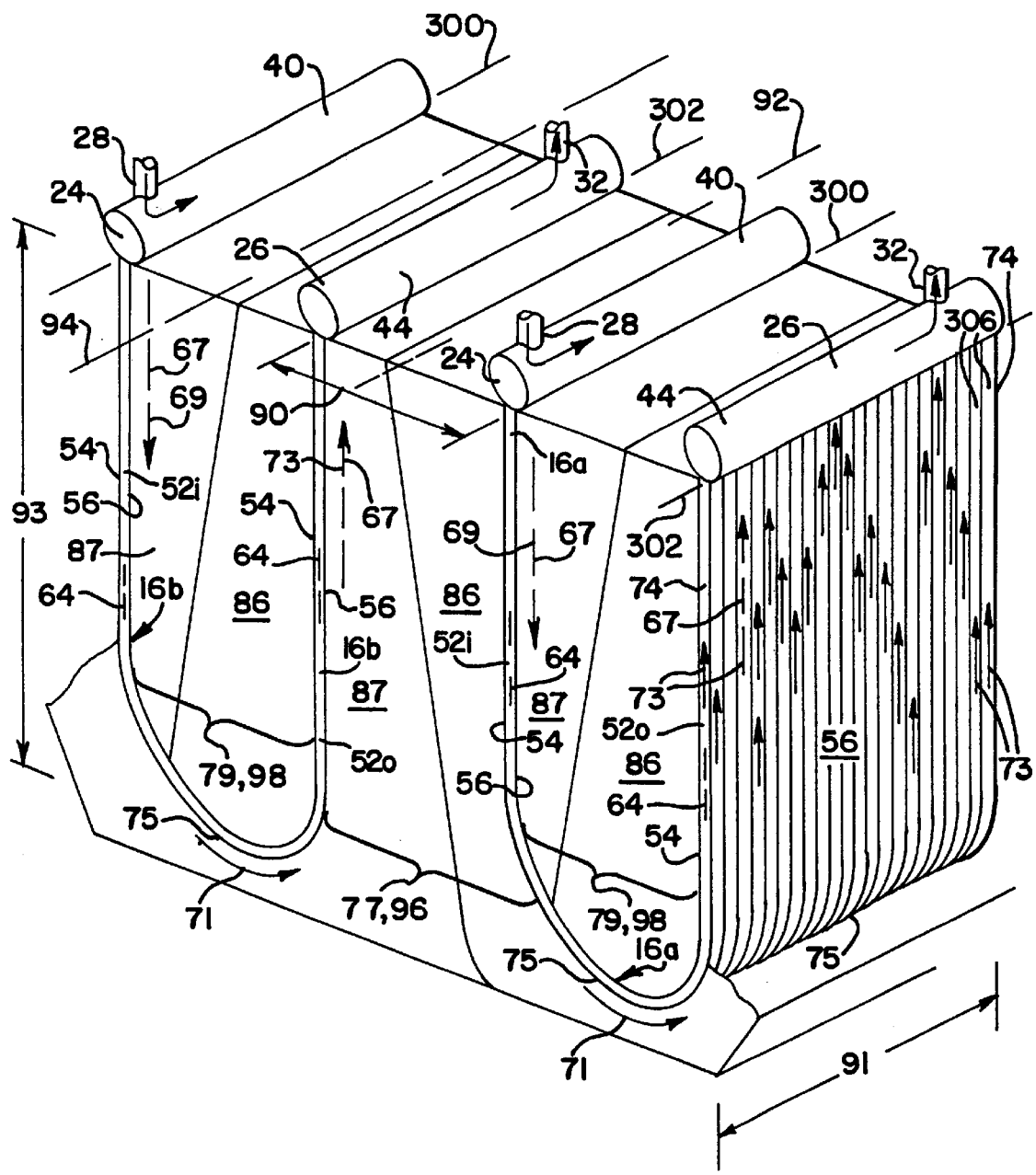
FIG. 7B is another partial perspective view of two heat exchange members aligned for use, showing solid phase change material formed between heat exchange members of the embodiment shown in FIGS. 10–13.

Each embodiment of the thermal storage apparatus 10 of the present invention has volumes 77 in the tank bordered by the side edges 74, bottom 75, and continuous surfaces 54, 56 of the heat exchange members 16a, 16b. For the first and fourth embodiments, these volumes are illustrated in FIGS. 7A and 7B, respectively; for the third embodiment, this volume is illustrated in FIG. 7; for the second embodiment, the volumes 77 would be similar to those shown in FIG. 7A for the first embodiment. In each case, these volumes 77 hold phase change material 14, and these volumes 77 of phase change material are separated from each other by the continuous surfaces 54, 56 of the heat exchange members. In addition, the volume 77 of phase change material along one of the continuous surfaces 54 of the first heat exchange member 16a is also bordered by the side edges 74, bottom 75 and one continuous surface 56 of the adjacent heat exchange member 16b; thus, as shown in FIGS. 7 and 7A, one volume 77 along one surface 54 of one heat exchange member 16a coincides with the volume 77 along the facing surface 56 of the adjacent heat exchange member 16b; as shown in FIG. 7B, the volume 77 along one heat exchange member 16a coincides with the volume 77 along the next adjacent heat exchange member 16b. In the embodiment of FIGS. 10–12, there is also a volume 79 of phase change material 14 in the tank bordered by the side edges 74, U-shaped tubes and continuous surfaces 54, 56 of each individual heat exchange member, as shown in FIGS. 7B and 11. For the fift and sixth embodiments of FIGS. 17–18, there would be volumes 77, 79 of phase change material similar to those shown in FIG. 7B, although shaped to conform with the shapes of the passageways 65, 66 of these embodiments.

As shown in FIGS. 5, 7, 7A, 7B and 16, when the phase change material 14 in these volumes 77, 79 changes to solid form, the solid phase change material forms a solid sheet or volume along one surface 54 of the first heat exchange member 16a that is substantially separated or isolated from the sheet or volume of solid phase change material along the other opposite surface 56 of that heat exchange member 16a. Thus, in all of the illustrated embodiments, the heat exchange members 16 prevent the phase change material 14 from forming a solid annulus encircling the tubular passageways 62. In the illustrated embodiments, this isolation is accomplished through the lateral connections between the passageways that, together with the passageways, form the substantially continuous opposite surfaces 54, 56 of the heat exchange members 16. It should be understood that various elements of the four illustrated embodiments may be combined, such as by connecting some passageways directly to each other and providing a connecting web in some other areas.

The present invention advantageously prevents the formation of annuluses of solid phase change material around the tubular passageways 62. This advantage can be seen from a comparison of FIGS. 4, 4A with FIGS. 5, 5A, 16 and 16A. In a thermal storage apparatus using discrete tubes 80, as in FIG. 4, with water used as the phase change material, during the ice-forming cycle, the water freezes to ice, forming a solid annulus 82 encircling the individual tubes of the heat exchanger. As the heat transfer fluid above the melting point of the annulus 82 is introduced into the heat exchange tube 80 at the start of the melt cycle, the ice nearest the surface of the tube 80 melts first, and melting continues radially outward so that an annulus of liquid phase change material 84 forms between the annulus of ice 82 and the tube 80, separating the heat transfer fluid from the ice, as shown in FIG. 4A. In the case of water, the thermal resistance of liquid water is about four times greater than that of ice. Thus, the thermal resistance of the annulus of water 84 decreases the efficiency of heat exchange between the heat transfer fluid in the tube 80 and the spaced column of ice 82. The thermal resistance of the FIG. 4A phenomenon may be determined through the following equation:

$$R = [r_o/12k] ln[r_o/r_i]$$

where k=thermal conductivity of water, Btu/(hr)(ft$^2$)( f/ft), $r_o$=outer radius of water annulus 84 (one-half of $D_o$ shown in FIG. 4A) and $r_i$=outer radius of heat exchange tube 80 (one-half of $D_i$ shown in FIG. 4A). For a tube diameter of ¼ inch and assuming that ¼ inch of an original ⅝ inch thickness of ice has melted, the value of $D_i$ is 0.250 inches and the value of $D_o$ is 0.75 inches. Thus, the thermal resistance $R_i$ is:

$$R_1 = [0.375/12k] ln [0.375/0.125]$$

$$R_1 = 0.03433/k$$

In contrast, with the heat exchange dividers 52 of the present invention, as shown in FIGS. 5 and 16, there are sheets or volumes 86, 87 of ice or solid phase change material formed at the continuous surfaces 54, 56 of the heat exchange members 16, instead of an annulus of ice, connected only along either the side edges 74 of the heat exchange members as shown in FIG. 5 or along the bottoms of the heat exchange members (not shown). As the heat transfer fluid 29 above the melting point of the sheets of ice 86, 87 is introduced into the heat exchange member 16 at the start of the melt cycle, the ice nearest the surface of the tube surfaces 54, 56 melts first, and melting continues outward so that layers 88, 89 of liquid phase change material forms instead of an annulus, as shown in FIGS. 5A and 16A. The sheets or volumes of ice 86, 87 and liquid phase layers 88, 89 are separated from each other by the substantially continuous opposite surfaces 54, 56 of the heat exchange member 16. For simplicity of calculation, the embodiment of FIG. 16A is used for the following calculation of thermal resistance, although it should be understood that the thermal resistance of the embodiment of FIG. 5A may be approximated in the same manner. For the FIG. 16A embodiment, the thermal resistance may be determined through the following equation:

$$R_2 = t/12k$$

where t=the thickness of the layer of water (see FIG. 16A), and k=the thermal conductivity of water. Assuming that ¼ inch of an original ⅝ inch thickness of ice has melted, then:

$$R_2 = 0.25/12k = 0.0208/k$$

and:

$$R_2/R_1 = 0.605$$

Thus, the thermal resistance of the present invention is lower than the thermal resistance of the prior art at equivalent points during the melt cycle. With the substantially lower thermal resistance $R_2$ of the present invention, heat transfer between the heat transfer fluid 29 in the passageways 62 and the solid phase change material or ice in the adjacent volumes 77, 79 should improve, and this heat transfer may be expected to be efficient throughout a longer portion of the melt cycle. With improved heat transfer between the heat transfer fluid and the ice, the heat transfer fluid may be cooled to an optimum temperature throughout a longer portion of the melt cycle, if not for the entire melt cycle, even after a layer of water separates the ice and the heat transfer fluid in the passageways 62. Thus, the present invention should improve the energy storage capacity of the thermal storage apparatus, and should prevent the temperature of the heat transfer fluid exiting the outlets from rising during a longer portion of the melt cycle.

The advantage of limiting the thermal resistance between the ice and the heat transfer fluid may also be enhanced by further limiting the thickness of the insulating water layer between the tubes and the ice during the melt cycle. To take advantage of the tendency of the ice to float upwards in the liquid phase change material during the melt cycle, the heat exchange members can be shaped so that the upward-floating ice nears or contacts one of the opposite surfaces 54, 56 of the heat exchange member 16. For example, instead of the vertically-disposed longitudinal axes 64 of the fluid passageways 62, the longitudinal axes may be set in parallel zig-zag or undulating patterns as shown in FIG. 17 by heat forming the heat exchange members or through the use of spacers or support elements, for example. Alternatively, some portions of the inlet and outlet tubular passageways may be set at different spacings rather than parallel, as shown in FIG. 18.

The present invention also makes efficient use of space and should prevent the temperature of the heat transfer fluid exiting the outlets during the melt cycle from rising near the outlets by optimizing the shape of solid phase change material or ice formed in the ice-forming cycle of the present invention. In the illustrated embodiments, complementary sheets of ice are formed during the ice-forming cycle to substantially fill the available space with ice.

As shown in FIGS. 1A and 10–11, the inlet passageways 65 of at least one of the heat exchange members 16a or 16b are positioned adjacent to at least one set of outlet passageways 66, and in the first embodiment, between two sets of outlet passageways 66; for the first embodiment, the inlet passageways 65 are positioned between outlet passageways of two other heat exchange members; for the fourth, fifth and sixth embodiments of FIGS. 10–13 and 17–18, the inlet passageways 65 of one heat exchange member are positioned between its own outlet passageways 66 and the outlet passageways of the adjacent heat exchange member. With the inlet and outlet passageways 65, 66 so arranged, the heat transfer fluid 29 flows in one direction, such as downward, in the inlet passageways of the second heat exchange member 16b while flowing in another direction, such as upward, in the nearest outlet passageways in the first heat exchange member 16*a*, and the flow direction in the connecting flow paths 71 of adjacent heat exchange members is generally in opposite directions at a given vertical level. Within each heat exchange member, the direction of flow in the inlet passageways is opposite to the direction of flow in the outlet passageways. Phase change material 14 in the volume 77 between the spaced opposing surfaces 54, 56 of the heat exchange members 16*a*, 16*b* is thus exposed to the effects of the coldest heat transfer fluid in the inlet passageways 65 on one side and to the effects of the warmest heat transfer fluid in the outlet passageways 66 on the other side. During the ice-forming cycle, thicker sheets or volumes of ice or solid phase change material should form alongside the coldest heat transfer fluid and thinner sheets or volumes should form alongside the warmer heat transfer fluid. Thus, as shown in FIGS. 7, 7A and 7B, complementary sheets or volumes of ice 86, 87 should be formed during the ice-forming cycle.

The relative temperatures of the heat transfer fluid 29 in the inlet and outlet passageways of adjacent panels 52, 52*i*, 52*o*, are as follows: along a plane that extends perpendicularly through the central longitudinal axis 64 of one of the fluid passageways 62 of the first heat exchange member 16*a* and through the central longitudinal axis 64 of one of the fluid passageways 62 of the second heat exchange member 16*b*, such as the plane 100 shown in FIGS. 1A, 8, 9, 11, and 17–18, the average temperature of the heat transfer fluid in that plane 100 in at least one fluid passageway 62 of one of the heat exchange members 16*a* or 16*b* is lower than the average temperature of the heat transfer fluid in that plane in at least one of the fluid passageways 62 in the nearest heat exchange member 16*a* or 16*b*. Thus, in FIG. 1A, during the ice-forming cycle, the average temperature of the heat transfer fluid in the inlet passageway 65 of heat exchange member 16*r* in plane 100 is less than the average temperature of the heat transfer fluid in the outlet passageway 66 of adjacent heat exchange member 16*q*. In FIG. 8, during the ice-forming cycle, the average temperature of the heat transfer fluid in inlet passageway 65 of heat exchange member 16*a* in plane 100 is less than the average temperature of the heat transfer fluid in that plane in the nearest outlet passageway 66 in the second heat transfer member 16*b*. In the embodiment of FIG. 9, the plane 100 is vertical and extends through the vertical portion of the continuous passageway in the first heat exchange member and curved passageways in the second heat exchange member 16*b*; during the ice-forming cycle, the average temperature of the heat transfer fluid in the vertical portion of the first heat exchange member 16*a* will be lower than the average temperature of the heat transfer fluid in the curved portions of the second heat exchange member 16*b*. In the embodiments of FIGS. 11 and 17–18, during the ice-forming cycle, the average temperature of the heat transfer fluid in the downward leading inlet passageways 65 of the second heat exchange member 16*b* in plane 100 will be lower than the average temperature of the heat transfer fluid in the outlet passageways 66 of that heat exchange member 16*b* and the adjacent heat exchange member 16*a* in that plane 100.

In the first, second, fourth, fifth and sixth illustrated embodiments, there are at least two inlet passageways and at least two outlet passageways. The average temperature of the heat transfer fluid in the two inlet passageways 65 at one vertical level, such as the level of plane 100 in the embodiments of FIGS. 1A, 8, 11, 17 and 18 is lower than the average temperature of the heat transfer fluid downstream of that vertical level, such as level 101, shown in FIGS. 1A, 8, 11, 17 and 18 during the ice-forming cycle. During the ice-forming cycle, the average temperature of the heat transfer fluid in the two outlet passageways 66 at one vertical level, such as the level of plane 100 in the embodiments of FIGS. 1A, 8, 11, 17 and 18 is higher than the average temperature of the heat transfer fluid upstream of that vertical level, such as level 101, shown in FIGS. 1A, 8, 11, 17 and 18. During the ice-forming cycle, the average temperature of the heat transfer fluid in the inlet passageways 65 at either level 100 or level 101 is lower than the average temperature of the heat transfer fluid in the outlet passageways 66 at the same level. During the melt cycle, the average temperature of the heat transfer fluid in the two inlet passageways 65 at one vertical level, such as the level of plane 100 in the embodiments of FIGS. 1A, 8, 11, 17 and 18, is higher than the average temperature of the heat transfer fluid downstream of that vertical level, such as level 101, shown in FIGS. 1A, 8, 11, 17 and 18. And during the melt cycle, the average temperature of the heat transfer fluid in the two outlet passageways 66 at one vertical level, such as the level of plane 100 in the embodiments of FIGS. 1A, 8, 11, 17 and 18, is lower than the average temperature of the heat transfer fluid upstream of that vertical level, such as level 101, shown in FIGS. 1A, 8, 11, 17 and 18. During the melt cycle, the average temperature of the heat transfer fluid in the inlet passageways 65 at either level 100 or 101 is higher than the average temperature of the heat transfer fluid in the outlet passageways 66 at the same level.

The relative flow directions of the heat transfer fluid in the inlet and outlet passageways of adjacent panels 52, 52*i*, 52*o* may be as follows: along a plane that extends perpendicularly through the central longitudinal axis 64 of one of the fluid passageways 62 of the first heat exchange member 16*a* and through the central longitudinal axis 64 of one of the fluid passageways 62 of the second heat exchange member 16*b*, such as the plane 100 shown in FIGS. 1A, 8, 9, 11, 17 and 18, the direction of flow of the heat transfer fluid through that plane 100 in at least one fluid passageway 62 of one of the heat exchange members 16*a* or 16*b* is different than the direction of flow of the heat transfer fluid through that plane in at least one of the fluid passageways 62 in the nearest heat exchange member 16*a* or 16*b*. Thus, in FIG. 1A, the direction of flow of the heat transfer fluid in the inlet passageway 65 of heat exchange member 16*r* in plane 100 is opposite to the direction of flow of the heat transfer fluid in the outlet passageway 66 of adjacent heat exchange member 16*q*. In FIG. 8, the direction of flow of the heat transfer fluid in inlet passageway 65 of heat exchange member 16*a* in plane 100 is opposite to the temperature of the heat transfer fluid through that plane 100 in the nearest outlet passageway 66 in the second heat transfer member 16*b*. In the embodiment of FIG. 9, the direction of flow of the heat transfer fluid in the vertical portion of the first heat exchange member 16*a* is downward while the direction of flow of the heat transfer fluid in the curved portions of the second heat exchange member 16*b* is curved and generally in an upward direction. In the embodiments of FIGS. 11, 17 and 18, the direction of flow of the heat transfer fluid in the downward leading inlet passageways 65 of the second heat exchange member 16*b* in plane 100 will be opposite to the direction of flow of the heat transfer fluid in the outlet passageways 66 of that heat exchange member 16*b* and the adjacent heat exchange member 16*a* through that plane 100.

These temperature and flow direction relationships result in the formation of adjacent complementary-shaped sheets of solid phase-change material or ice 86, 87 during the ice-forming cycle, as illustrated in FIGS. 7, 7A and 7B. With the complementary sheets of ice or solid phase change material 86, 87 forming large masses of ice near the inlets 24 and the outlets 26, during the melt cycle, the heat transfer fluid in the outlet passageways 66 continues to be exposed to cold phase change material. Thus, during the melt cycle, the heat transfer fluid may be exposed to cold phase change material throughout the entire course of travel through the fluid passageways 62. The total thickness of the mass of ice between panels is shown at 90 in FIGS. 7, 7A and 7B, and this mass of ice extends from one edge 74 to the opposite edge 74 of each heat exchange member, across the dimension shown at 91. This mass of ice also extends between the top and bottom of each heat exchange member, as shown at dimension 93 in FIGS. 7, 7A and 7B. The mass of ice may have a uniform thickness across all these dimensions 90, 91, 93, as in the embodiments of FIGS. 7 and 7A. The mass of ice may have a uniform thickness across dimensions 90 and 91 and across a substantial portion of another dimension 93, as in the embodiment of FIG. 7B. Or, in the case of the embodiment of FIG. 18, the mass of ice may have areas of uniform thickness and areas of non-uniform thickness. As in the embodiments of FIGS. 7, 7A and 7B, the mass of ice may be symmetrical about a central plane 92 midway between the surfaces 54, 56 of the two heat exchange members 16a, 16b. The total mass of ice in the volumes 77 is shown at 96 in FIGS. 7, 7A and 7B, and equals the combined ice sheets or formations 86 and 87. In the embodiment of FIGS. 7B and 10–12, the total mass of ice formed in the volume 79 between the inlet and outlet planes 300, 302 is also symmetrical about a central plane 94 between these planes 300, 302, as shown in FIG. 7B. This total mass of ice in the volume 79 is shown at 98 in FIG. 7B, and equals the combined sheets or masses of ice formations 86 and 87 in this volume 79.

It should be understood that the thickness of ice need not be uniform, and that the mass of ice need not be symmetrical about a single plane. For example, considering the embodiment of FIG. 17, it would be expected that some of the ice formed between the panels 16a, 16b and between the inlet and outlet passageways 65, 66 of the individual panels would be substantially uniform in thickness, and that several portions would be symmetrical about individual non-vertical planes. For the embodiment of FIG. 18, there would be expected to be areas of thinner or thicker ice masses formed at the curved portions of the inlet and outlet passageways. However, in all of the illustrated embodiments, complementary sheets of ice should be formed that should be adequate to prevent warming of the heat exchange fluid near the outlets 26 and that make efficient use of the available space.

In the embodiments of FIGS. 17–18, the shapes of the tubular passageways 62 are arranged to take advantage of movement of the ice formations during the melt cycle. Thus, considering FIG. 17, as ice between the inlet and outlet passageways 65, 66 melts and floats upward on the liquid phase change material, the ice will move closer to the outlet passageways 66. As the ice moves closer to the outlet passageways, there is a smaller layer of liquid phase change material between the ice and the heat transfer fluid in the outlet passageways. With a smaller layer of liquid phase change material, the thermal resistance is lowered, allowing for improved heat transfer between the heat transfer fluid and the solid phase change material. Similar effects should result with the FIG. 18 embodiment.

The desired temperature and flow direction relationships and desired ice formations are achieved in the first, second and third embodiments of FIGS. 1–7A and 8–9 by turning adjacent heat exchange members 180° from each other about their central vertical axes 22. Thus, in the first, second and third embodiments, the positions of the elements of the adjacent heat exchange members 16a, 16b are reversed: the positions of the inlet headers 40 and outlet headers 44 of the adjacent heat exchange members 16a, 16b are reversed, with the inlet headers 40 and inlet passageways 65 of adjacent heat exchange members being on opposite sides of the central plane 20 of the tank, and the outlet headers 44 and outlet passageways 66 of adjacent heat exchange members being on opposite sides of the central plane 20. Thus, on each side of the central plane 20, the inlet headers 40 and inlet passageways 65 alternate with the outlet headers 44 and outlet passageways 66. In the first and second embodiments, the heat transfer fluid enters one heat exchange member on one side of the central plane 20, and enters the adjacent heat exchange member on the opposite side of the central plane. The heat transfer fluid flows in parallel, opposite directions through the two heat exchange members rather than serially or in the same direction.

In the fourth, fifth and sixth embodiments of FIGS. 10–13 and 17–18, the temperature and flow direction relationships and ice formation patterns result from the inlet passageways 65 of one of the heat exchange members 16a or 16b being positioned between the outlet passageways 66 of both the first and second heat exchange members 16a and 16b. The inlet headers 40 and inlet passageways 65 alternate with the outlet headers 44 and outlet passageways 66 across a dimension of the tank. At several vertical levels in the tank, the heat transfer fluid in the inlet passageways 65 of one of the heat exchange members is flowing downward and the heat transfer fluid in the outlet passageways 66 of the adjacent heat exchange member is flowing upward, and the temperatures of the heat transfer fluid in each member at that level is different: during the ice-forming cycle, the heat transfer fluid in the inlet passageways 65 is colder than the heat transfer fluid in the outlet passageways 66 at that level; during the melt cycle, the heat transfer fluid in the inlet passageways 65 is warmer than the heat transfer fluid in the outlet passageways 66 at that level.

One additional advantage of the present invention is that each of the heat exchange members 16 has a large surface area for heat transfer. Although the exposed surface area for heat transfer for each individual passageway 62 is not as great as if the passageways were discrete and isolated from one another, the number of passageways and the concentration of passageways is increased, so that the total exposed surface area for heat transfer is increased.

The heat exchange members 16 of any of the illustrated embodiments, may be supported in the tank 12 by any suitable mechanical means. Preferably, for the first, and second embodiments of FIGS. 1–2 and 8, the heat exchange members 16 are in a vertical position, with the central axes 64 of the passageways 62 of the adjacent heat exchange members in parallel vertical planes, with the inlet and outlet headers 40, 44 at the top, the lower connecting header 48 submerged in the tank 12, and the entire heat exchange divider 52 immersed in the phase change material 14. The positions of the lower ends of the heat exchange members 16 may be maintained at a predetermined spacing between the heat exchange members by setting some mechanical holding device in the tank, such as a pair of spring clips that would releasably clasp the lower connecting header 48 of each heat exchange member 16. With such a connector, proper positioning of each heat exchange member can be assured, while also allowing for each individual heat exchange member to be removed from the tank for replacement, service or repair without disturbing the remaining components of the apparatus. The tops of the heat exchange members may be similarly releasably supported for both vertical and lateral stability. Alternatively, both the tops and bottoms of the heat exchange members of the first and second embodiments, or the tops of the fourth embodiment, may be supported in their proper positions through the use of apertured plates at both ends of the headers 40, 44, such as the plate 314 shown in FIGS. 1A and 11. The apertured plates 314 may have apertures 316 corresponding with the size and desired position of each header 40, 44, and the ends of the headers 40, 44 may be received in the apertures 316 to assure that the headers 40, 44 are in the desired positions. The tank walls 18 may have support brackets 318 upon which the bottoms of the apertured plates 314 may be supported, and any suitable hold down device may be used to act against the apertured plates 314 to prevent them from floating upward. Examples of apertured plate supports are illustrated in FIGS. 1–2 and 10–12, but it should be understood that a variety of supports may be used, and the invention is not limited to any particular support system. The adjacent heat exchange members 16 are laterally spaced apart to leave sufficient room for sheets of ice to form on the surfaces 54, 56 of adjacent heat exchange members, allowing for the expansion of the ice.

It should be understood that although the first, second and fourth embodiments show generally upward and downward flow, the heat exchange elements could be disposed differently, such as at a 90° angle to the illustrated positions, with horizontal flow in opposite directions.

In using the thermal storage apparatuses of the present invention, the heat exchange members 16 may be connected to a chiller 30 and heat exchange apparatus 34 as shown for example in FIGS. 1, 6 and 10, or in any other suitable manner. The thermal storage apparatuses may then be used in a standard manner.

Thus, it should be seen that the present invention provides a thermal storage apparatus that is simple to make and assemble. The heat exchange members may be readily stacked for storage and for transport to the job site. If made of a plastic material, the heat exchange members are relatively lightweight. The heat exchange members provide a large surface area for heat transfer during both the ice-forming and melt cycles, and prevent the formation of annuluses of ice, thereby decreasing thermal resistance during the melt cycle. The heat exchange members are arranged so that during the melt cycle, the heat exchange fluid does not gain heat near the outlets. Moreover, the individual plastic heat exchange members may be installed in the tank on site, facilitating movement of the components into an exiting structure such as the basement of a building. In addition. the capacity of a system can be tailored as needed, with the size of the tank increased for example, or with multiple serially-arranged tanks, and additional or fewer heat exchange members installed as desired. Since the members are preformed, with predetermined and preformed spacing between the passageways, and possibly preformed spacers on each heat exchange member to set a preferred distance between heat exchange members, the available space in the tank may be used efficiently.

It should be understood that the heat exchange members of the present invention may be used with both internal and external melt types of thermal storage apparatuses.

While only specific embodiments of the invention have been described and shown, those in the art should recognize that various modifications can be made thereto and alternatives used. In addition, it should be recognized that the present invention has applications beyond the illustrated environment. It is, therefore, the intention in the appended claims to cover all such modifications and alternatives and applications as may fall within the true scope of the invention.

We claim:

1. A thermal storage apparatus comprising:

a tank;

a phase change material in the tank;

a heat exchange member having an inlet, an outlet, substantially continuous opposite surfaces in contact with the phase change material, and a plurality of fluid passageways in fluid communication with the inlet and the outlet, at least parts of the fluid passageways being immersed in the phase change material in the tank and at least substantial parts of the immersed fluid passageways being laterally connected to each other to define at least parts of the substantially continuous opposite surfaces, at least parts of the substantially continuous opposite surfaces being in contact with the phase change material in the tank; and a heat transfer fluid in the fluid passageways, said fluid passageways defining a flow path for the heat transfer fluid from said inlet to said outlet;

wherein a substantial part of said phase change material adjacent one of said substantially continuous opposite surfaces is separated from a substantial part of said phase change material adjacent the other of said substantially continuous opposite surfaces by the heat exchange member so that said phase change material does not encircle the fluid passageways for at least a substantial part of the heat transfer fluid flow path between the inlet and the outlet of the heat exchange member.

2. The thermal storage apparatus of claim 1 wherein said inlet comprises an inlet header and a plurality of said fluid passageways are linear, adjacent and parallel to each other and connected to said inlet header.

3. The thermal storage apparatus of claim 2 wherein at least two adjacent inlet fluid passageways are connected to said inlet header and wherein the flow of heat transfer fluid through the two fluid passageways is in the same direction so that the average temperature of the heat transfer fluid in the two fluid passageways at one vertical level is different from the average temperature of the heat transfer fluid downstream of said one vertical level.

4. The thermal storage apparatus of claim 3 wherein the outlet comprises an outlet header spaced from the inlet header, and wherein the fluid passageways include at least two adjacent outlet fluid passageways connected to said outlet header, said heat exchange member further including connecting fluid passageways between said inlet fluid passageways and said outlet fluid passageways, wherein a plane through the inlet header and inlet fluid passageways is spaced from a plane through the outlet header and outlet fluid passageways and wherein at one vertical level, the temperature of the heat transfer fluid in the inlet fluid passageways is different from the temperature of the heat transfer fluid in the outlet fluid passageways at the same vertical level.

5. The thermal storage apparatus of claim 4 wherein each passageway has an outer dimension and the distance between the central longitudinal axes of adjacent fluid passageways is at most 100% of the outer dimension of the adjacent passageways.

6. The thermal storage apparatus of claim 4 wherein each inlet fluid passageway, connecting fluid passageway and outlet fluid passageway comprises a continuous tube extending from the inlet header to the outlet header.

7. The thermal storage apparatus of claim 1 wherein said inlet includes an inlet conduit and said outlet includes an outlet conduit, said fluid passageways are connected end to end between said inlet conduit and said outlet conduit to provide a continuous flow path, and the heat exchange member includes a web connecting the fluid passageways along a substantial part of the length of the flow path.

8. The thermal storage apparatus of claim 1 wherein the heat exchange member comprises a divider panel and wherein the fluid passageways are laterally connected along substantially their entire lengths.

9. The thermal storage apparatus of claim 1 wherein the inlet comprises an inlet header and the outlet comprises an outlet header, the heat exchange member further comprising a lower connecting header spaced from the inlet header and outlet header, wherein the fluid passageways include a plurality of substantially linear inlet fluid passageways extending between the inlet header and the connecting header and a plurality of substantially linear outlet fluid passageways extending from the connecting header to the outlet header.

10. The thermal storage apparatus of claim 1 wherein the inlet comprises an inlet header, the outlet comprises an outlet header, the apparatus further including a first lower connecting header spaced from the inlet header and outlet header, an upper connecting header between the inlet header and outlet header and a second lower connecting header spaced from the inlet header, outlet header and upper connecting header, wherein said fluid passageways include a plurality of adjacent inlet passageways connecting the inlet header and the first lower connecting header, a plurality of adjacent connecting passageways connecting the lower connecting header and the upper connecting header, a plurality of adjacent connecting passageways connecting the upper connecting header and the second lower connecting header, and a plurality of adjacent outlet passageways connecting the lower connecting header and the outlet header to provide a flow path for said heat transfer fluid from said inlet header through said inlet passageways to said first lower connecting header, from said first lower connecting header through said connecting passageways to said upper connecting header, through said connecting passageways from said upper connecting header to said second lower connecting header, and through said outlet passageways from said second lower connecting header to said outlet header.

* * * * *